United States Patent
Zhang et al.

(10) Patent No.: US 10,911,170 B2
(45) Date of Patent: Feb. 2, 2021

(54) METHOD AND APPARATUS FOR MULTIPLEXING DEMODULATION REFERENCE SIGNALS AND COMMUNICATION SYSTEM

(71) Applicant: FUJITSU LIMITED, Kawasaki (JP)

(72) Inventors: Jian Zhang, Beijing (CN); Xin Wang, Beijing (CN); Wei Xi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 16/264,951

(22) Filed: Feb. 1, 2019

(65) Prior Publication Data

US 2019/0165873 A1    May 30, 2019

Related U.S. Application Data

(63) Continuation of application No. PCT/CN2016/094890, filed on Aug. 12, 2016.

(51) Int. Cl.
  *H04W 4/00* (2018.01)
  *H04J 1/08* (2006.01)
  (Continued)

(52) U.S. Cl.
  CPC ............... *H04J 1/08* (2013.01); *H04J 13/00* (2013.01); *H04L 5/001* (2013.01); *H04L 5/0051* (2013.01);
  (Continued)

(58) Field of Classification Search
  CPC ....... H04L 5/001; H04L 5/0051; H04L 27/26; H04L 5/0007; H04L 5/0016
  See application file for complete search history.

(56) References Cited

U.S. PATENT DOCUMENTS 9,380,570 B2    6/2016    Takeda et al.
10,243,713 B2 *  3/2019    Chen .................... H04L 5/0051
(Continued)

FOREIGN PATENT DOCUMENTS

| CN | 101989970 A | 3/2011 |
| CN | 102882566 A | 1/2013 |

(Continued)

OTHER PUBLICATIONS

International Search Report issued by the State Intellectual Property Office of the P.R. China for corresponding International Patent Application No. PCT/CN2016/094890, dated Apr. 27, 2017, with an English translation.

(Continued)

*Primary Examiner* — Abdelnabi O Musa
(74) *Attorney, Agent, or Firm* — Myers Wolin, LLC.

(57) ABSTRACT

A method and apparatus for multiplexing demodulation reference signals and a communication system. The method for multiplexing includes: transmitting data and DM-RSs by using one or more time-frequency resource blocks; the DM-RSs of each UE or each data stream occupy a part of frequency-domain resources of the time-frequency resource blocks, the DM-RSs of a part of UEs or data streams are superimposed on identical time-domain resources in a manner of frequency-division multiplexing, and the DM-RSs of a part of the UEs or data streams are superimposed on identical time-frequency resources in a manner of code-division multiplexing. Hence, even if in a case of massive UEs access, the DM-RSs may be multiplexed within given time-frequency resources, while performance of transmission may still be ensured.

18 Claims, 8 Drawing Sheets

(51) Int. Cl.
    *H04L 27/26* (2006.01)
    *H04L 5/00* (2006.01)
    *H04J 13/00* (2011.01)
(52) U.S. Cl.
    CPC .......... *H04L 27/26* (2013.01); *H04L 27/2613* (2013.01); *H04L 5/0007* (2013.01); *H04L 5/0016* (2013.01)

(56) References Cited

U.S. PATENT DOCUMENTS

| | | | |
|---|---|---|---|
| 2012/0230290 A1* | 9/2012 | Seo | H04L 1/0026 370/329 |
| 2012/0275414 A1* | 11/2012 | Hu | H04B 7/0452 370/329 |
| 2015/0381395 A1* | 12/2015 | Guo | H04L 5/0014 370/329 |
| 2016/0308646 A1* | 10/2016 | Qiao | H04L 1/00 |
| 2018/0026684 A1* | 1/2018 | Wei | H04W 72/1289 370/329 |
| 2018/0278313 A1* | 9/2018 | Kim | H04B 7/04 |
| 2019/0036661 A1* | 1/2019 | Ko | H04L 5/006 |

FOREIGN PATENT DOCUMENTS

| | | |
|---|---|---|
| JP | 2013-197877 A | 9/2013 |
| WO | 2014/127676 A1 | 8/2014 |
| WO | 2015/096081 A1 | 7/2015 |

OTHER PUBLICATIONS

Written Opinion of the International Searching Authority for corresponding International Patent Application No. PCT/CN2016/094890, dated Apr. 27, 2017, with an English translation.

Notice of Reasons for Refusal issued by the Japan Patent Office for corresponding Japanese Patent Application No. 2019-506150 dated May 19, 2020 with an English translation.

Samsung, "Discussion on DMRS OCC Sequence Mapping across OFDM symbols" 3GPP TSG-RAN WG1#60b R1-102189, Apr. 6, 2010, pp. 1-6. Cited in JPOA dated May 19, 2020.

Huawei, "Remaining issues for DMRS", 3GPP TSG-RAN WG1#60b R1-101951, Apr. 6, 2010. Cited in JPOA dated May 19, 2020.

First Notification of Office Action issued by the China National Intellectual Property Administration for corresponding Chinese Patent Application No. 201680087992.3, dated Nov. 27, 2020, with an English translation.

* cited by examiner

METHOD AND APPARATUS FOR MULTIPLEXING DEMODULATION REFERENCE SIGNALS AND COMMUNICATION SYSTEM

CROSS REFERENCE TO RELATED APPLICATIONS

This application is a continuation application of International Application PCT/CN2016/094890 filed on Aug. 12, 2016, the entire contents of which are incorporated herein by reference.

TECHNICAL FIELD

This disclosure relates to the field of communication technologies, and in particular to a method and apparatus for multiplexing demodulation reference signals (DM-RSs) and a communication system.

BACKGROUND

An uplink DM-RS is defined in standards of a long-term evolution (LTE) system, and in a long-term evolution advanced (LTE-advanced) system, a DM-RS may be used to support uplink single-user multiple input multiple output (MIMO) and multi-user MIMO.

FIG. 1 is a schematic diagram of a position of a DM-RS in LTE/LTE-A, in which a resource block (RB) is taken as an example to show a position of a DM-RS used in estimation of a physical uplink shared channel (PUSCH).

In the existing standards, the DM-RS uses a ZC (Zadoff-Chu) sequence, and in the same cell, different user equipments use ZC sequences with different cyclic shifts. The characteristics of the ZC sequences may make DM-RSs of different user equipments orthogonal to each other. Therefore, after receiving the DM-RSs that are superimposed through channels, a base station is able to distinguish different user equipments, and recover and estimate respective channels of different user equipments.

In addition, as shown in FIG. 1, an orthogonal cover code (OCC) is a group of orthogonal codes with a length of 2, with values being {1, 1} or {1, −1}. On the basis of the ZC sequence, orthogonal distinguishing may further be provided to the user equipment by using the orthogonal cover code.

On the other hand, machine type communication is an important trend in the development of future communication technologies. Compared with former communication systems with natural people as main users, the machine type communication will have more user equipments accessing to the system. The future fifth-generation (5G) mobile communication systems need to meet the demands of large-scale machine communication, hence, non-orthogonal multiple access technology has been widely studied.

Compared with traditional orthogonal multiple access methods such as orthogonal frequency division multiplexing (OFDM), the non-orthogonal multiple access is able to simultaneously accommodate more user equipments for data transmission, and obtain "overload" gains to a certain extent, thereby improving connection density and spectral efficiency.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that as more user equipments simultaneously transmit data in the future communication, a base station needs to perform channel estimation and demodulation on more user equipments, so more DM-RSs are needed. For large-scale multiple access, the number of DM-RSs required may exceed the number of DM-RSs defined in the LTE/LTE-A system. When more DM-RSs need to be transmitted, how to multiplex these DM-RSs in given time-frequency resources is a problem that needs to be solved.

In addition, the DM-RSs of different user equipments in the LTE/LTE-A system are multiplexed together essentially in a code division multiplexing (CDM) manner. And when the number of user equipments continues to increase, orthogonality of the codes is more likely to be destroyed by channel fading. Therefore, in large-scale user equipments access, multiplexing the DM-RSs by using the CDM manner may not always maintain performance advantages.

Embodiments of this disclosure provide a method and apparatus for multiplexing demodulation reference signals and a communication system, in which DM-RSs from different user equipments are multiplexed by using frequency division multiplexing (FDM) and CDM in a combined manner.

According to a first aspect of the embodiments of this disclosure, there is provided a method for multiplexing demodulation reference signals, including:

transmitting data and demodulation reference signals by using one or more time-frequency resource blocks;

wherein, the demodulation reference signals of each UE or each data stream occupy a part of frequency-domain resources of the time-frequency resource blocks, the demodulation reference signals of a part of UEs or data streams are superimposed on identical time-domain resources in a manner of frequency-division multiplexing, and the demodulation reference signals of a part of the UEs or data streams are superimposed on identical time-frequency resources in a manner of code-division multiplexing.

According to a second aspect of the embodiments of this disclosure, there is provided an apparatus for multiplexing demodulation reference signals, including:

a transmitting unit configured to transmit data and demodulation reference signals by using one or more time-frequency resource blocks;

wherein, the demodulation reference signals of each UE or each data stream occupy a part of frequency-domain resources of the time-frequency resource blocks, the demodulation reference signals of a part of UEs or data streams are superimposed on identical time-domain resources in a manner of frequency-division multiplexing, and the demodulation reference signals of a part of the UEs or data streams are superimposed on identical time-frequency resources in a manner of code-division multiplexing.

According to a third aspect of the embodiments of this disclosure, there is provided a communication system, including:

a plurality of UEs configured to transmit data and demodulation reference signals by using one or more time-frequency resource blocks; and a base station configured to receive the demodulation reference signals transmitted by the plurality of UEs, and perform channel estimation and data demodulation and decoding according to the demodulation reference signals;

wherein, the data and demodulation reference signals of each UE or each data stream occupy a part of frequency-domain resources of the time-frequency resource blocks, the demodulation reference signals of a part of the UEs or data streams are superimposed on identical time-domain resources in a manner of frequency-division multiplexing, and the demodulation reference signals of a part of the UEs or data streams are superimposed on identical time-frequency resources in a manner of code-division multiplexing.

An advantage of the embodiments of this disclosure exists in that DM-RSs from different user equipments are multiplexed by using FDM and CDM in a combined manner. The FDM may completely avoid collision interference between the DM-RSs of the UEs, and the CDM may use orthogonal codes within limited resources to multiplex more UEs. Hence, even if in a case of massive UEs access, the DM-RSs may be multiplexed within given time-frequency resources, while performance of transmission may still be ensured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a node B, or an evolved node B (eNB), etc., and may include some or all functions of them. A term "base station" shall be used in the text, and each base station provides communication coverage for a specific geographical region. And a term "cell" may refer to a base station and/or its coverage area, which is dependent on a context of the term.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a machine type communication device, a lap-top computer, and a cordless telephone, etc.

In this disclosure, DM-RSs from different user equipments are multiplexed by using FDM and CDM in a combined manner. The FDM may completely avoid collision interference between the DM-RSs of the UEs, and the CDM may use orthogonal codes within limited resources to multiplex more UEs. The DM-RSs are used to differentiate different channels, and these channels may be from different UEs, or may be from different spatial data streams (which may also be referred to as layers). Hence, different DM-RSs may be used to decouple or estimate channels experienced by different UEs or different spatial data streams.

Following description shall be given by taking that UE in a communication system is a transmitting device and a base station is a receiving device as an example. However, this disclosure is not limited thereto; for example, the transmitting device and/or the receiving device may also be other network device(s).

Embodiment 1

Figure 1:
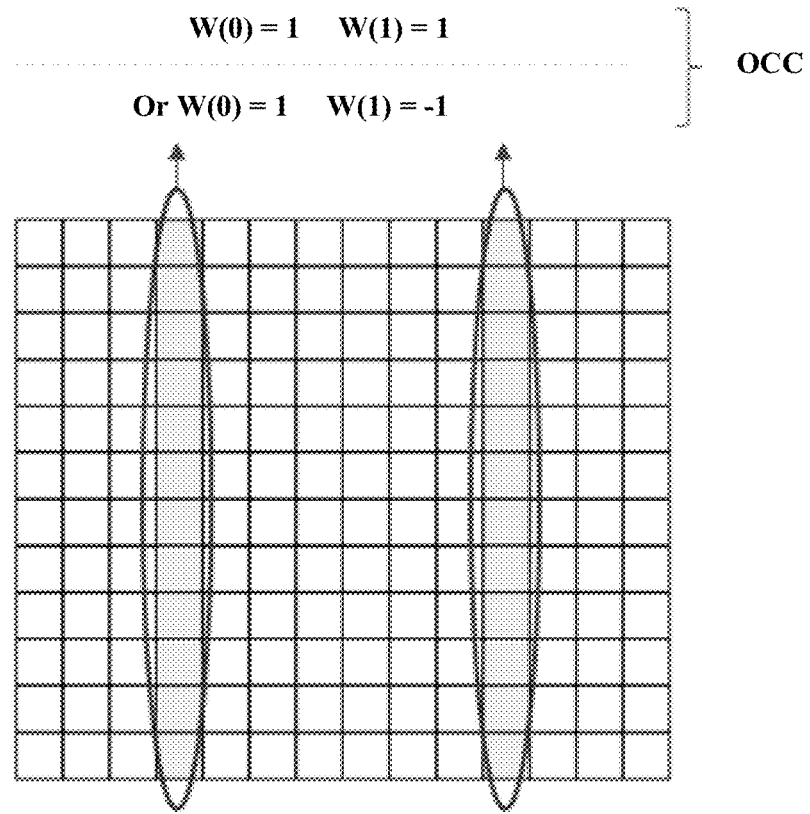
FIG. 1 is a schematic diagram of a position of a DM-RS in LTE/LTE-A.
Figure 2:
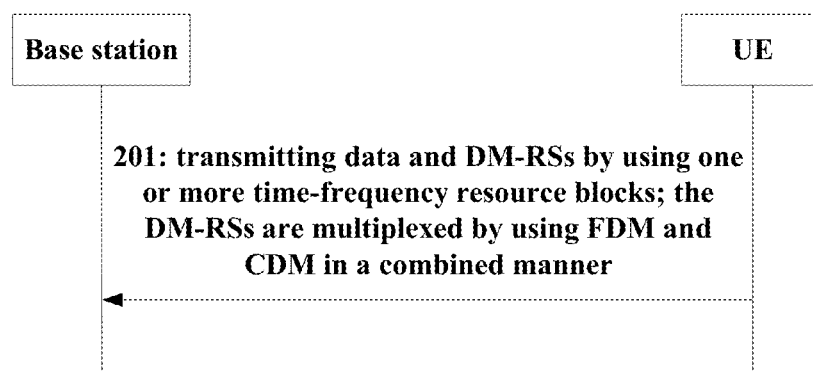
FIG. 2 is a flowchart of the method for multiplexing demodulation reference signals of Embodiment 1 of this disclosure.

The embodiments of this disclosure provide a method for multiplexing demodulation reference signals. FIG. 2 is a flowchart of the method for multiplexing demodulation reference signals of the embodiment of this disclosure. As shown in FIG. 2, the method includes:

201: UEs transmit data and DM-RSs by using one or more time-frequency resource blocks. The DM-RSs are multiplexed by using FDM and CDM in a combined manner.

That is, a plurality of UEs transmit data and DM-RSs to a base station, the DM-RSs of each UE or each data stream occupying a part of frequency-domain resources of the time-frequency resource blocks; the DM-RSs of a part of UEs or data streams are superimposed on identical time-domain resources in a manner of FDM, and the DM-RSs of a part of the UEs or data streams are superimposed on identical time-frequency resources in a manner of CDM.

In an embodiment, the base station may be a macro base station (such as an eNB), and the UE may be served by a macro cell generated by the macro base station; or the base station may also be a pico base station, and the UE may be served by a pico cell or a small cell generated by the pico base station. However, this disclosure is not limited thereto, and a particular scenario may be determined according to an actual situation. For the sake of simplicity, FIG. 2 shall be described by taking only one UE as an example.

In an embodiment, a minimum granularity of time-frequency resources of the UE for performing data and DM-RS transmission may be defined as a resource block (RB), which is defined as a time-frequency resource block containing 12 subcarriers in a frequency direction and 14 OFDM symbols in a time direction in the LTE system.

In a future communication system (such as a 5G system), according to different services or frequency points, a size (or magnitude) of an RB may be redefined. And no matter which definition is used, when the UE uses one or more RBs for performing uplink data transmission, the DM-RSs are transmitted in the RBs occupied by the UE, and the base station performs equivalent channel estimation and data demodulation and decoding according to the DM-RSs.

For the sake of description, a minimum resource allocation unit (referred to as a time-frequency resource block in this text) being 1 RB is taken as an example. And a particular content or constitution of the time-frequency resource block is not limited in this disclosure.

Figure 3:
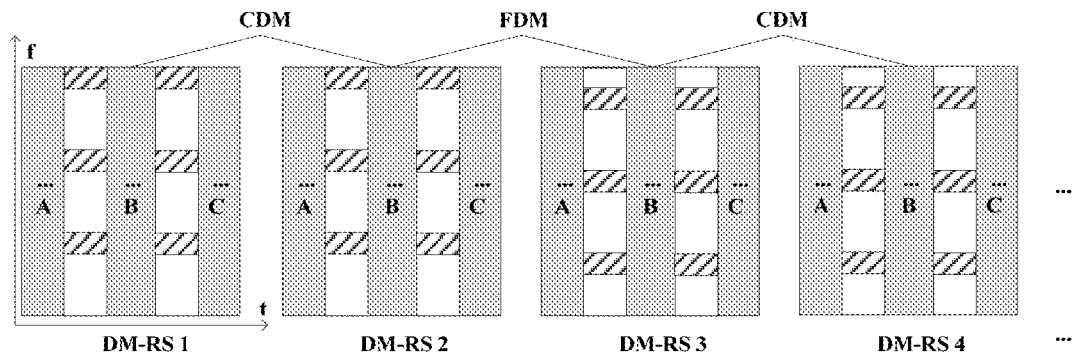
FIG. 3 is an exemplary diagram of DM-RS multiplexing in Embodiment 1 of this disclosure.

FIG. 3 is an exemplary diagram of DM-RS multiplexing in the embodiment of this disclosure, which shall be described by taking 4 DM-RSs needing to be multiplexed into 1 RB as an example. As shown in FIG. 3, gray regions A, B and C are time-frequency resources occupied by data symbols, shadowed regions denote time-frequency resources occupied by DM-RS symbols, and blank regions denote "being unoccupied".

It is here assumed that the DM-RSs exist in 2 columns of time domain resources, which is similar to 2 OFDM symbols in an LTE system. Different DM-RSs are marked by using different numbers, each DM-RS corresponding to a UE or corresponding to a spatial data stream, as described above.

As shown in FIG. 3, DM-RS 1 and DM-RS 3 occupy different frequency positions, that is, they are multiplexed in an FDM manner. And DM-RS 1 and DM-RS 2 occupy identical frequency positions, but they are multiplexed in a CDM manner, that is, different OCCs are used.

Figure 4:
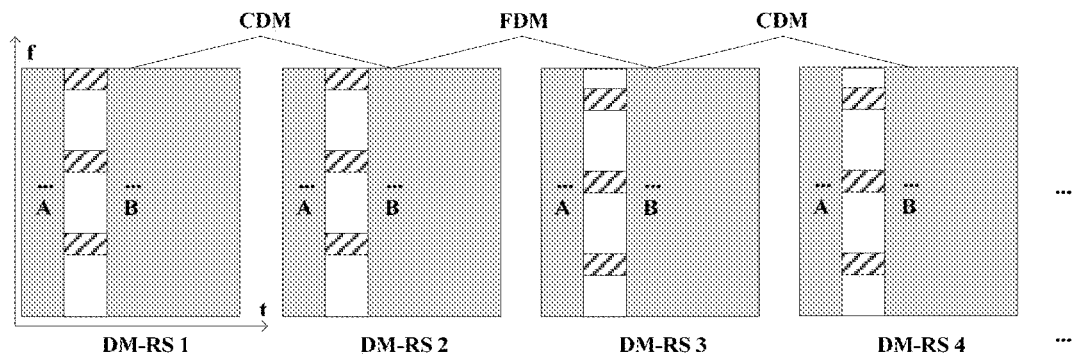
FIG. 4 is another exemplary diagram of DM-RS multiplexing in Embodiment 1 of this disclosure.

FIG. 4 is another exemplary diagram of DM-RS multiplexing in the embodiment of this disclosure, in which a case where DM-RSs exist only in 1 column of time-domain resources is shown. As shown in FIG. 4, gray regions A and B are time-frequency resources occupied by data symbols, shadowed regions denote time-frequency resources occupied by DM-RS symbols, and blank regions denote "being unoccupied".

As shown in FIG. 4, DM-RS 1 and DM-RS 3 occupy different frequency positions, that is, they are multiplexed in an FDM manner. And DM-RS 1 and DM-RS 2 occupy identical frequency positions, but they are multiplexed in a CDM manner, that is, different OCCs are used.

As shown in FIGS. 3 and 4, different from the LTE standard, each DM-RS in this disclosure does not completely occupy all subcarriers in the frequency direction, that is, the DM-RSs in this disclosure are sparse in 1 RB, and different DM-RSs are multiplexed in an FDM manner, or are multiplexed by using different OCCs in a CDM manner.

In an embodiment, DM-RSs of a part of UEs or data streams are superimposed on different time-domain resources in a manner of time-division multiplexing (TDM). That is, the number of DM-RSs may further be increased if necessary, to support access of more UEs, and more columns of time-domain resources may possibly be allocated for the DM-RSs.

Figure 5:
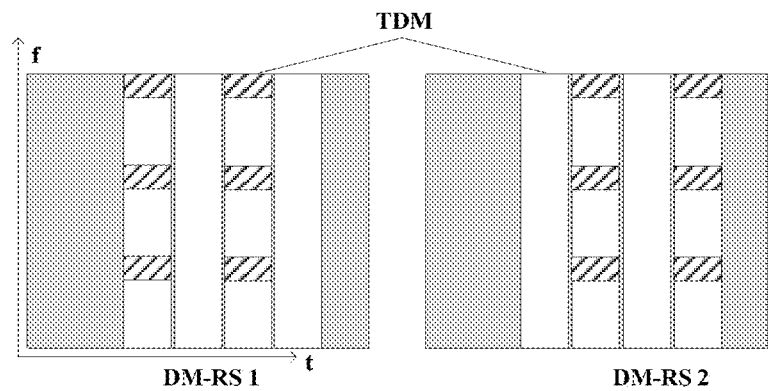
FIG. 5 is a further exemplary diagram of DM-RS multiplexing in Embodiment 1 of this disclosure.

FIG. 5 is a further exemplary diagram of DM-RS multiplexing in the embodiment of this disclosure. As shown in FIG. 5, for example, DM-RS 1 and DM-RS 2 may be multiplexed in a TDM manner, but correspondingly, a part of data resources needs to be sacrificed. For example, an RB where DM-RS 1 is located needs to vacate a data resource coinciding with DM-RS 2 to avoid interference, and vice versa.

In an embodiment, power or energy of each resource element transmitting the DM-RSs may be increased. That is, the power or energy of each resource element of the DM-RSs of the embodiment of this disclosure may further be increased relative to each resource element transmitting DM-RSs in an LTE/LTE-A system.

In an embodiment, as the DM-RSs is sparsely distributed in the frequency direction and there exists no data mapping and transmission at positions of other resources (such as being referred to as resource elements (REs)) in the same column of time-domain resources (such as an OFDM symbol) as the DM-RSs, the transmission power/energy boosting of each resource element of the DM-RSs can be enhanced. That is, energies on an "unused" RE are transferred to the DM-RSs for use, which is helpful in improving accuracy of channel estimation.

It can be seen from the above embodiment that DM-RSs from different user equipments are multiplexed by using FDM and CDM in a combined manner. The FDM may completely avoid collision interference between the DM-RSs of the UEs, and the CDM may use orthogonal codes within limited resources to multiplex more UEs. Hence, even if in a case of massive UEs access, the DM-RSs may be multiplexed within time-frequency resources, while performance of transmission may still be ensured.

Embodiment 2

On the basis of Embodiment 1, the embodiments of this disclosure further describe DM-RS multiplexing by grouping, with contents identical to those in Embodiment 1 being not going to be described herein any further.

In an embodiment, DM-RSs of the UEs or the data streams are divided into a plurality of groups, DM-RSs in each group being superimposed on identical time-frequency resources in a manner of CDM, and the DM-RSs between the groups being superimposed on identical time-domain resources in a manner of FDM.

Taking still the definition of the RB in the LTE system as an example, an example of a particular method of DM-RS multiplexing under the assumed condition is given. For the sake of expression, the structure of the RB in the LTE may be abstracted and simplified.

Figure 6:
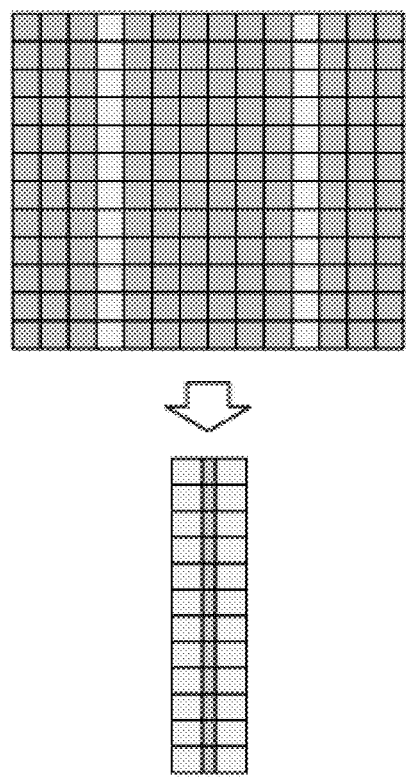
FIG. 6 is a schematic diagram of abstracting and simplifying a resource structure in Embodiment 2 of this disclosure.

FIG. 6 is a schematic diagram of abstracting and simplifying a resource structure in the embodiment of this disclosure. As shown in FIG. 6, an integral RB may be simplified into a form shown in the lower part of FIG. 6, with OFDM symbols where two columns of DM-RSs are located being only reserved, and 6 OFDM symbols between original two columns of DM-RSs are simplified into a column of areas expressed by a relatively dark color. As the embodiment of this disclosure focuses only on DM-RSs, omitting and simplifying of the data areas have no effect on understanding and interpretation of this disclosure.

Figure 7:
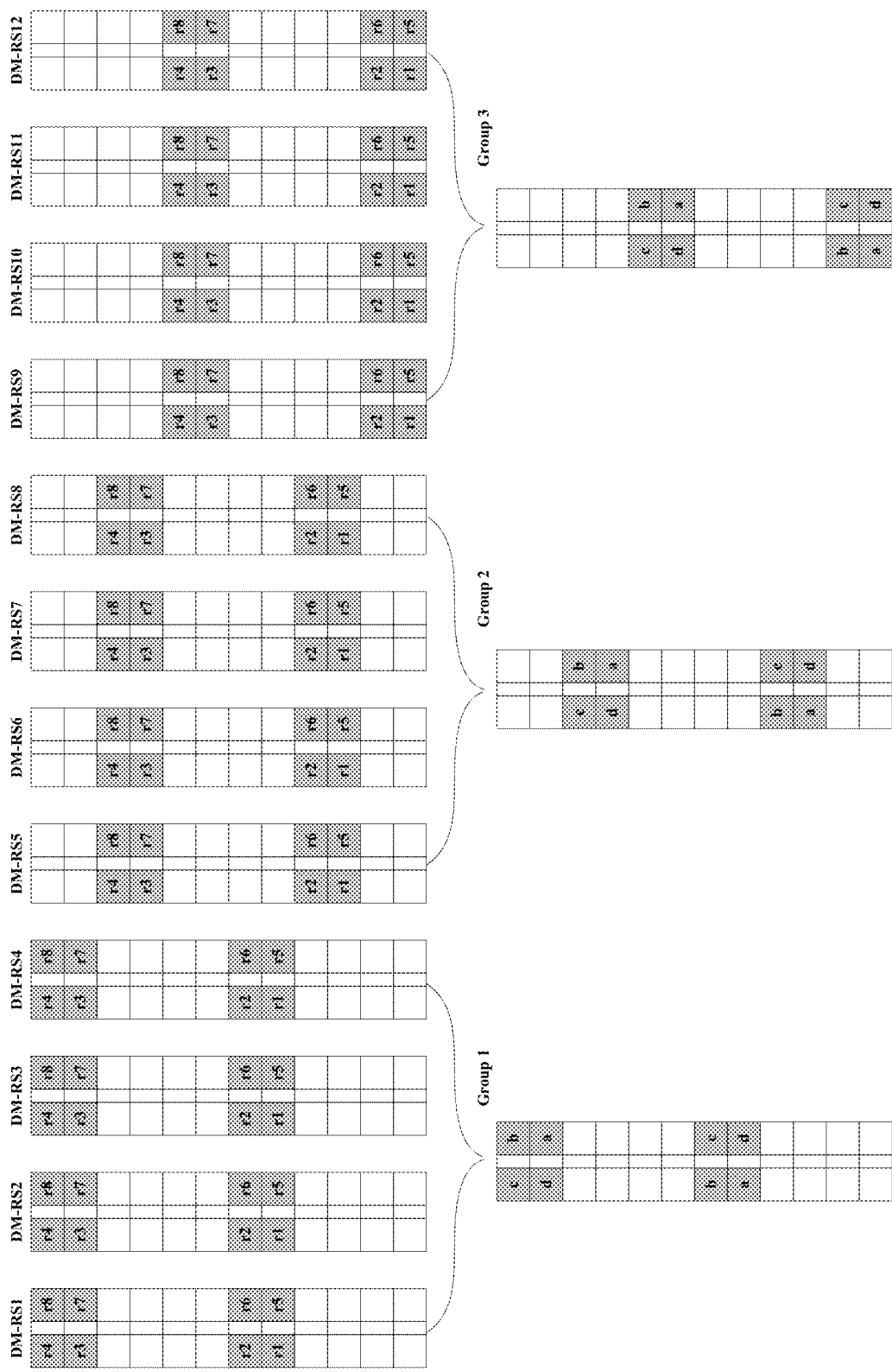
FIG. 7 is an exemplary diagram of DM-RS multiplexing in Embodiment 2 of this disclosure.

FIG. 7 is an exemplary diagram of DM-RS multiplexing in the embodiment of this disclosure, in which a case where 12 DM-RSs in an RB in an LTE system, i.e. DM-RS 1 to DM-RS 12, are multiplexed, is given. The DM-RSs in each RB are mapped onto 8 REs, r1 to r8 denoting DM-RS sequences. Here, it is assumed that DM-RS 1 to DM-RS 12 use identical sequences, in practice, different DM-RSs may used different sequences. When allocated resources are more than 1 RBs, a DM-RS sequence length is also increased. For example, in case of 2 RBs, a DM-RS sequence length is 16.

As shown in FIG. 7, 12 DM-RSs are divided into 3 groups; in which DM-RSs between group 1, group 2 and group 3 (such as DM-RSs 1-4 and DM-RSs 5-8) occupy different REs, and multiplexed in a manner of FDM; DM-RSs in the same groups (such as DM-RS 1 to DM-RS 4) occupy the same REs, and multiplexed in a manner of CDM.

An OCC with a length of 4 may be used here, which is defined as a matrix form as follows:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} = \begin{bmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{bmatrix} = [a \ b \ c \ d].$$

Each row in the matrix corresponds to an OCC, and the OCC is multiplied by original DM-RS sequences in an element by element manner. Four DM-RSs in each group respectively use four different OCCs, use and superimposition of the OCCs being as shown in the lower part of FIG. 7. In order to observe configuration of the OCCs, original DM-RS sequences r1 to r8 are omitted, and only the used OCCs are reserved.

In an embodiment, for the DM-RSs in each group, DM-RSs arranged in the time-domain direction in the same time-frequency resource block may use a group of orthogonal OCCs, and DM-RSs arranged in the frequency-domain direction in the same time-frequency resource block may also use a group of orthogonal OCCs. And furthermore, in a case where at least two time-frequency resource blocks are used, DM-RSs adjacently arranged in a cross-resource-block manner in the frequency-domain direction may also use a group of orthogonal OCCs.

Figure 8:
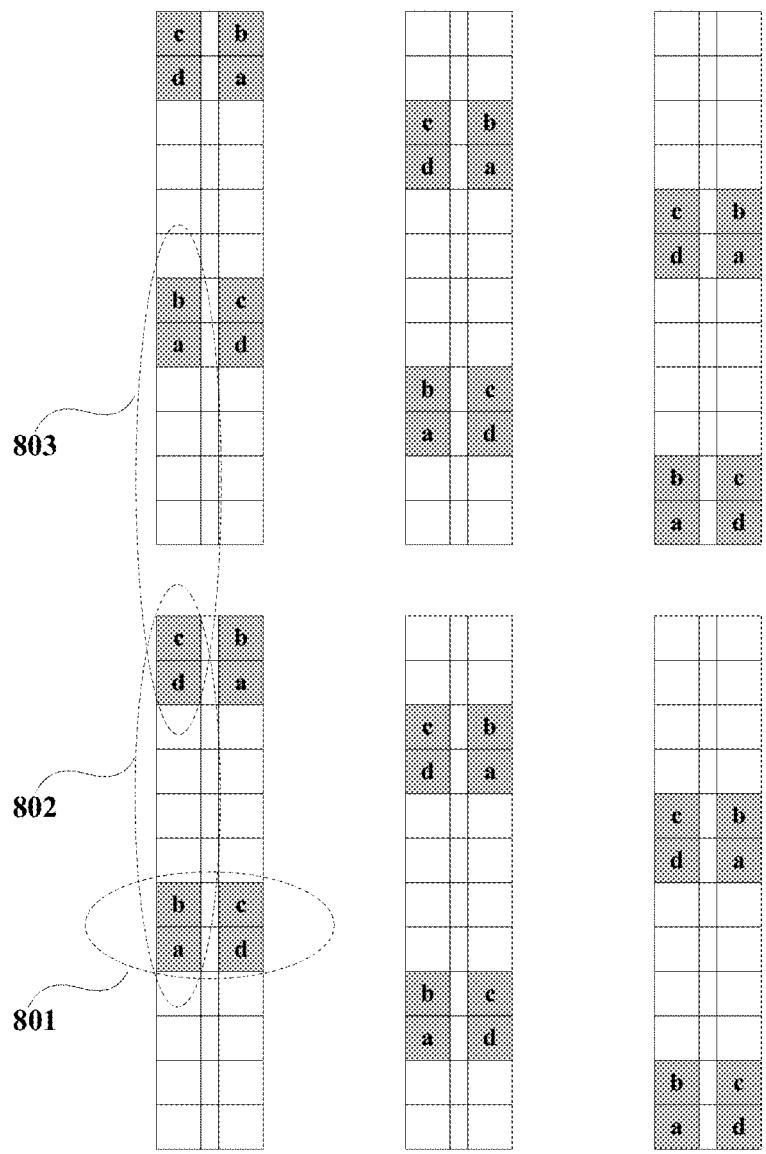
FIG. 8 is another exemplary diagram of DM-RS multiplexing in Embodiment 2 of this disclosure.

FIG. 8 is another exemplary diagram of DM-RS multiplexing in the embodiment of this disclosure, in which the configuration of the OCCs is further described by taking 2 RBs as an example. The configuration of the OCCs provides more orthogonality as possible, so as to offer more flexibility for OCC despreading and channel interpolation operation of the base station.

As shown in FIG. 8, 4 DM-RS REs (as shown in 801 in FIG. 8) spanning 2 OFDM symbols in a time direction constitute a group of orthogonal OCCs, and 4 DM-RS REs (as shown in 802 in FIG. 8) in the same OFDM symbol in a frequency direction also constitute a group of orthogonal OCCs. And furthermore, 4 DM-RS REs (as shown in 803 in FIG. 8) in the same OFDM symbol spanning 2 RBs in the frequency direction also constitute a group of orthogonal OCCs. That is, the configuration of the OCCs has orthogonality in both the time and frequency dimensions.

Figure 9:
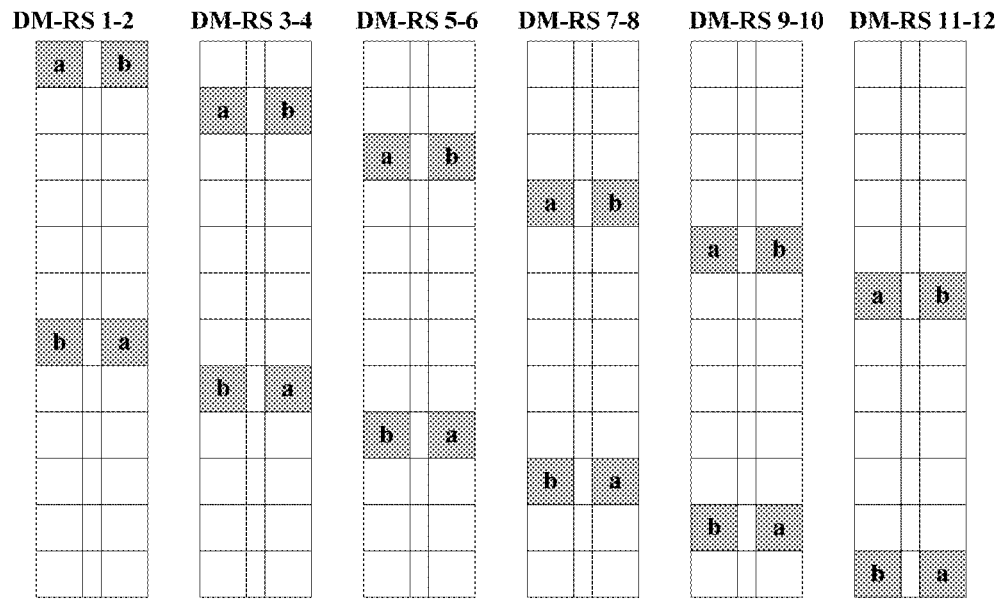
FIG. 9 is a further exemplary diagram of DM-RS multiplexing in Embodiment 2 of this disclosure.

FIG. 9 is a further exemplary diagram of DM-RS multiplexing in the embodiment of this disclosure, in which another example of multiplexing 12 DM-RSs in an RB is given. As shown in FIG. 9, each DM-RS pair in DM-RSs 1-12 (each DM-RS pair may be deemed as one group, such as DM-RS 1 and DM-RS 2) is multiplexed in a CDM manner, and 6 DM-RS pairs are multiplexed in an FDM manner.

Here, a length of an OCC is 2, which may be defined as a matrix expression as:

$$\begin{bmatrix} 1 & 1 \\ 1 & -1 \end{bmatrix} = [a \ b].$$

Hence, the configuration of the OCCs is as shown in FIG. 9, which is also able to make the OCCs orthogonal both in the time and frequency dimensions.

It can be seen from the above embodiment that DM-RSs from different user equipments are multiplexed by using FDM and CDM in a combined manner. The FDM may completely avoid collision interference between the DM-RSs of the UEs, and the CDM may use orthogonal codes within limited resources to multiplex more UEs. Hence, even if in a case of massive UEs access, the DM-RSs may be multiplexed within given time-frequency resources, while performance of transmission may still be ensured.

Embodiment 3

The embodiments of this disclosure provide an apparatus for multiplexing demodulation reference signals, which may be configured in a UE, or may be configured in a base station. Contents in these embodiments identical to those in Embodiments 1 and 2 shall not be described herein any further.

Figure 10:
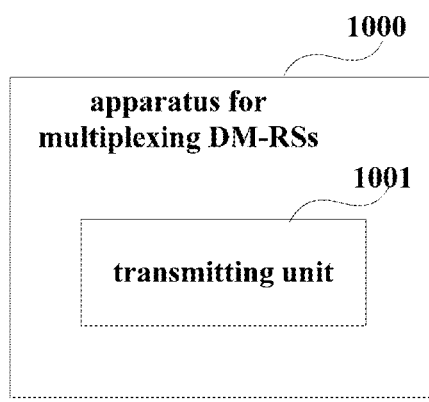
FIG. 10 is a schematic diagram of the apparatus for multiplexing demodulation reference signals in Embodiment 3 of this disclosure.

FIG. 10 is a schematic diagram of the apparatus for multiplexing demodulation reference signals in the embodiment of this disclosure. As shown in FIG. 10, the apparatus 1000 for multiplexing demodulation reference signals includes:

a transmitting unit 1001 configured to transmit data and DM-RSs by using one or more time-frequency resource blocks;

the DM-RSs of each UE or each data stream occupy a part of frequency-domain resources of the time-frequency resource blocks, the DM-RSs of a part of UEs or data streams are superimposed on identical time-domain resources in a manner of frequency-division multiplexing, and the DM-RSs of a part of the UEs or data streams are superimposed on identical time-frequency resources in a manner of code-division multiplexing.

In an embodiment, the DM-RSs of a part of UEs or data streams may further be superimposed on different time-domain resources in a manner of TDM.

In an embodiment, the DM-RSs of the UEs or the data streams may be divided into a plurality of groups, the DM-RSs in each group being superimposed on identical time-frequency resources in a manner of CDM, and the DM-RSs between the groups being superimposed on identical time-domain resources in a manner of FDM.

In an embodiment, for the DM-RSs in each group, the DM-RSs arranged in a time-domain direction in the same time-frequency resource block may use a group of orthogonal cover codes, and the DM-RSs arranged in a frequency-domain direction in the same time-frequency resource block may also use a group of orthogonal cover codes. And furthermore, in a case where at least two time-frequency resource blocks are used, the DM-RSs adjacently arranged in the frequency-domain direction in a manner of cross resource blocks may also use a group of orthogonal cover codes.

In an embodiment, power or energy of each resource element transmitting the DM-RSs may be increased.

It can be seen from the above embodiment that DM-RSs from different user equipments are multiplexed by using FDM and CDM in a combined manner. The FDM may completely avoid collision interference between the DM-RSs of the UEs, and the CDM may use orthogonal codes within limited resources to multiplex more UEs. Hence, even if in a case of massive UEs access, the DM-RSs may be multiplexed within given time-frequency resources, while performance of transmission may still be ensured.

Embodiment 4

The embodiments of this disclosure provide a communication system, with contents identical to those in Embodiments 1-3 being not going to be described herein any further. The communication system includes:

a plurality of UEs configured to transmit data and DM-RSs by using one or more time-frequency resource blocks; and a base station configured to receive the DM-RSs transmitted by the plurality of UEs, and perform channel estimation and data demodulation and decoding according to the DM-RSs.

The data and DM-RSs of each UE or each data stream occupy a part of frequency-domain resources of the time-frequency resource blocks, the DM-RSs of a part of the UEs or data streams are superimposed on identical time-domain resources in a manner of frequency-division multiplexing, and the DM-RSs of a part of the UEs or data streams are superimposed on identical time-frequency resources in a manner of code-division multiplexing.

Figure 11:
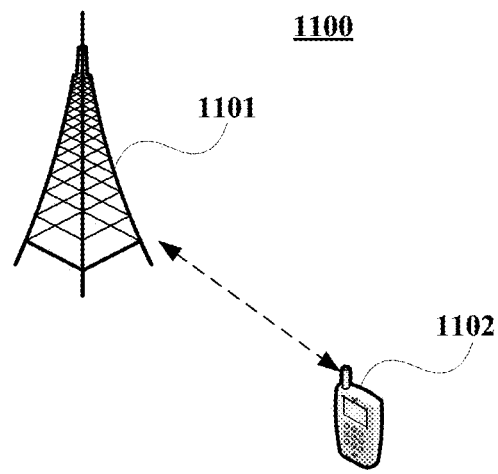
FIG. 11 is a schematic diagram of the communication system in Embodiment 4 of this disclosure.

FIG. 11 is a schematic diagram of the communication system in the embodiment of this disclosure, in which a case where a transmitting device is a UE and a receiving device is a base station is schematically described. As shown in FIG. 11, the communication system 1100 may include a base station 1101 and a UE 1102; the base station 1101 and/or the UE 1102 may be configured with the apparatus 1000 for multiplexing demodulation reference signals as described in Embodiment 3.

The embodiment of this disclosure further provides a transmitting device, such as a UE; however, this disclosure is not limited thereto, and it may also be another network device. Following description shall be given by taking a UE as an example.

Figure 12:
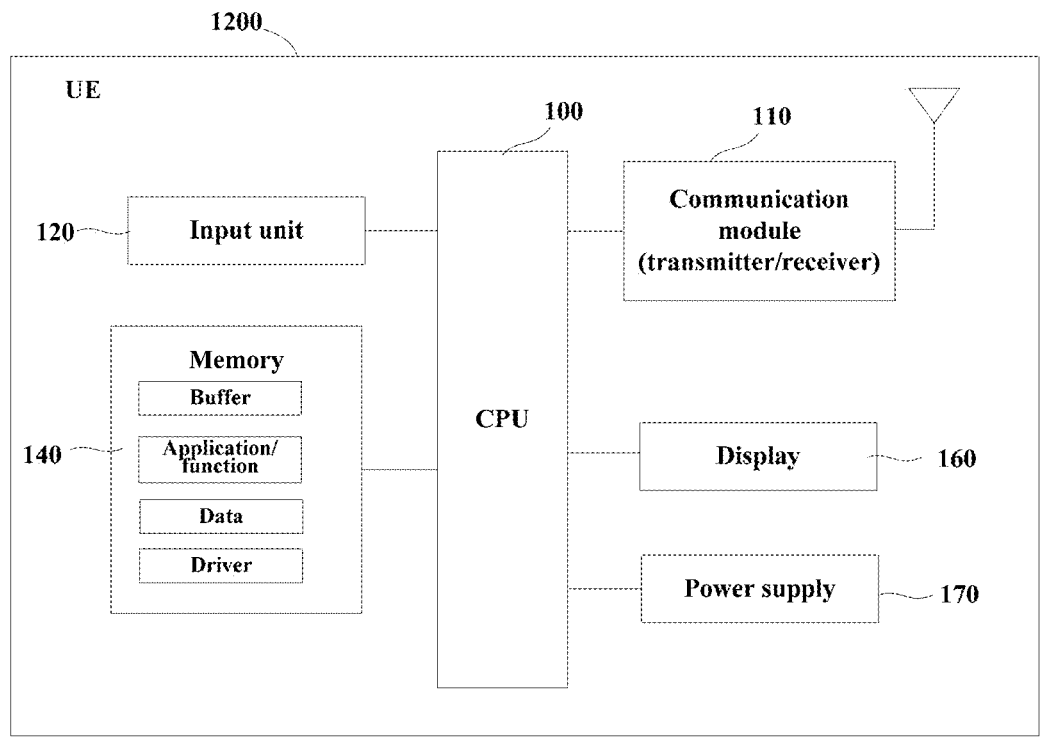
FIG. 12 is a schematic diagram of the user equipment in Embodiment 4 of this disclosure.

FIG. 12 is a schematic diagram of the UE of the embodiment of this disclosure. As shown in FIG. 12, the UE 1200 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions. The central processing unit 100 may be configured to carry out the method for multiplexing demodulation reference signals described in Embodiment 1.

For example, the central processing unit 100 may be configured to perform following control: transmitting data and DM-RSs by using one or more time-frequency resource blocks; the DM-RSs of each UE or each data stream occupy a part of frequency-domain resources of the time-frequency resource blocks, the DM-RSs of a part of UEs or data streams are superimposed on identical time-domain resources in a manner of FDM, and the DM-RSs of a part of the UEs or data streams are superimposed on identical time-frequency resources in a manner of CDM.

As shown in FIG. 12, the UE 1200 may further include a communication module 110, an input unit 120, a display 160 and a power supply 170. Functions of the above components are similar to those in the relevant art, and shall not be described herein any further. It should be noted that the UE 1200 does not necessarily include all the parts shown in FIG. 12, and the above components are not necessary; and furthermore, the UE 1200 may include parts not shown in FIG. 12, and the relevant art may be referred to.

The embodiment of this disclosure further provides a receiving device, such as a base station; however, this disclosure is not limited thereto, and it may also be another network device. Following description shall be given by taking a base station as an example.

Figure 13:
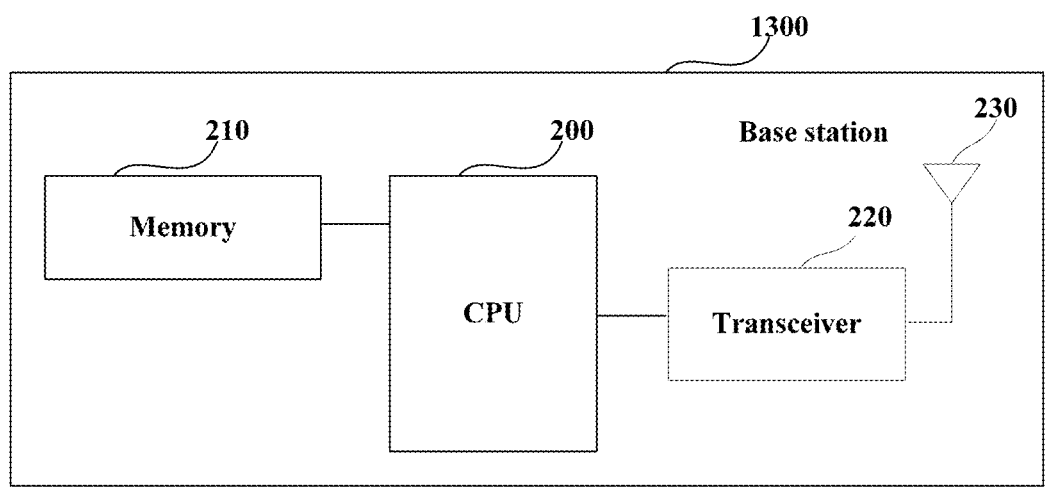
FIG. 13 is a schematic diagram of the base station in Embodiment 4 of this disclosure.

FIG. 13 is a schematic diagram of the base station in the embodiment of this disclosure. As shown in FIG. 13, the base station 1300 may include a central processing unit (CPU) 200 and a memory 210, the memory 210 being coupled to the central processing unit 200. The memory 210 may store various data, and furthermore, it may store a program for information processing, and execute the program under control of the central processing unit 200. And the central processing unit 200 may be configured to carry out the method for multiplexing demodulation reference signals described in Embodiment 1.

For example, the central processing unit 200 may be configured to perform following control: transmitting data and DM-RSs by using one or more time-frequency resource blocks; the DM-RSs of each UE or each data stream occupy a part of frequency-domain resources of the time-frequency resource blocks, the DM-RSs of a part of UEs or data streams are superimposed on identical time-domain resources in a manner of FDM, and the DM-RSs of a part of the UEs or data streams are superimposed on identical time-frequency resources in a manner of CDM.

Furthermore, as shown in FIG. 13, the base station 1300 may include a transceiver 220, and an antenna 230, etc. Functions of the above components are similar to those in the relevant art, and shall not be described herein any further. It should be noted that the base station 1300 does not necessarily include all the parts shown in FIG. 13, and furthermore, the base station 1300 may include parts not shown in FIG. 13, and the relevant art may be referred to.

An embodiment of the present disclosure provides a computer readable program code, which, when executed in an apparatus for multiplexing demodulation reference signals or a UE, will cause the apparatus for multiplexing demodulation reference signals or the UE to carry out the method for multiplexing demodulation reference signals as described in Embodiment 1.

An embodiment of the present disclosure provides a computer readable medium, including a computer readable program code, which will cause an apparatus for multiplexing demodulation reference signals or a UE to carry out the method for multiplexing demodulation reference signals as described in Embodiment 1.

An embodiment of the present disclosure provides a computer readable program code, which, when executed in an apparatus for multiplexing demodulation reference signals or a base station, will cause the apparatus for multiplexing demodulation reference signals or the base station to carry out the method for multiplexing demodulation reference signals as described in Embodiment 1.

An embodiment of the present disclosure provides a computer readable medium, including a computer readable program code, which will cause an apparatus for multiplexing demodulation reference signals or a base station to carry out the method for multiplexing demodulation reference signals as described in Embodiment 1.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 10 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A method for multiplexing demodulation reference signals, comprising:
    allocating demodulation reference signals supporting a plurality of User Equipments (UEs) or data streams in one or more time-frequency resource blocks so that the demodulation reference signals of each UE or each data stream occupy subcarriers 0, 1, 6, and 7, or subcarriers 2, 3, 8, and 9, or subcarriers 4, 5, 10, and 11 of each resource block; and
    transmitting data and the allocated demodulation reference signals using the one or more time-frequency resource blocks;
    wherein, the demodulation reference signals of each UE or each data stream occupy subcarriers 0, 1, 6, 7; or subcarriers 2, 3, 8, 9; or subcarriers 4, 5, 10, 11 of each resource block, and wherein
    the demodulation reference signals of the plurality of UEs or data streams are superimposed on identical time-domain resources in a manner of frequency-division multiplexing, and the demodulation reference signals of the plurality of the UEs or data streams are superimposed on identical time-frequency resources in a manner of code-division multiplexing.

2. The method for multiplexing demodulation reference signals according to claim 1, wherein the demodulation reference signals of the plurality of UEs or data streams are further superimposed on different time-domain resources in a manner of time-division multiplexing.

3. The method for multiplexing demodulation reference signals according to claim 1, wherein the demodulation reference signals of the UEs or the data streams are divided into a plurality of groups, the demodulation reference signals in each group being superimposed on identical time-frequency resources in a manner of code-division multiplexing, and the demodulation reference signals between the groups being superimposed on identical time-domain resources in a manner of frequency-division multiplexing.

4. The method for multiplexing according to claim 3, wherein the identical time-frequency resources are determined by the intersection of 2 symbols in the time domain and 4 subcarriers in the frequency domain within a resource block such that each group comprises 8 resource elements.

5. The method for multiplexing demodulation reference signals according to claim 4, wherein for the demodulation reference signals in each group, use of orthogonal cover codes satisfies the following conditions that: the demodulation reference signals arranged in a time-domain direction in the same time-frequency resource block use a group of orthogonal cover codes, and the demodulation reference signals arranged in a frequency-domain direction in the same time-frequency resource block also use a group of orthogonal cover codes.

6. The method for multiplexing demodulation reference signals according to claim 5, wherein at least two time-frequency resource blocks are used, and the use of the orthogonal cover codes further satisfies the condition that: the demodulation reference signals adjacently arranged in the frequency-domain direction in a manner of cross resource blocks also use a group of orthogonal cover codes.

7. The method for multiplexing demodulation reference signals according to claim 1, wherein power or energy of each resource element transmitting the demodulation reference signals is increased.

8. The method for multiplexing demodulation reference signals according to claim 1, wherein the transmitted data and demodulation reference signals support up to 12 UEs or data streams.

9. An apparatus for multiplexing demodulation reference signals, comprising:
a memory that stores a plurality of instructions;
a processor coupled to the memory and configured to execute the instructions to:
allocate demodulation reference signals supporting a plurality of User Equipments (UEs) or data streams in one or more time-frequency resource blocks so that the demodulation reference signals of each UE or each data stream occupy subcarriers 0, 1, 6, and 7, or subcarriers 2, 3, 8, and 9, or subcarriers 4, 5, 10, and 11 of each resource block; and
transmit data and the allocated demodulation reference signals using the one or more time-frequency resource blocks,
wherein, the demodulation reference signals of each UE or each data stream occupy subcarriers 0, 1, 6, 7; or subcarriers 2, 3, 8, 9; or subcarriers 4, 5, 10, 11 of each resource block, and wherein
the demodulation reference signals of the plurality of UEs or data streams are superimposed on identical time-domain resources in a manner of frequency-division multiplexing, and the demodulation reference signals of the plurality of the UEs or data streams are superimposed on identical time-frequency resources in a manner of code-division multiplexing.

10. The apparatus for multiplexing demodulation reference signals according to claim 9, wherein the demodulation reference signals of the plurality of UEs or data streams are further superimposed on different time-domain resources in a manner of time-division multiplexing.

11. The apparatus for multiplexing demodulation reference signals according to claim 9, wherein the demodulation reference signals of the UEs or the data stream are divided into a plurality of groups, the demodulation reference signals in each group being superimposed on identical time-frequency resources in a manner of code-division multiplexing, and the demodulation reference signals between the groups being superimposed on identical time-domain resources in a manner of frequency-division multiplexing.

12. The apparatus for multiplexing according to claim 11, wherein the identical time-frequency resources are determined by the intersection of 2 symbols in the time domain and 4 subcarriers in the frequency domain within a resource block such that each group comprises 8 resource elements.

13. The apparatus for multiplexing demodulation reference signals according to claim 12, wherein for the demodulation reference signals in each group, use of orthogonal cover codes satisfies the following conditions that: the demodulation reference signals arranged in a time-domain direction in the same time-frequency resource block use a group of orthogonal cover codes, and the demodulation reference signals arranged in a frequency-domain direction in the same time-frequency resource block also use a group of orthogonal cover codes.

14. The apparatus for multiplexing demodulation reference signals according to claim 13, wherein at least two time-frequency resource blocks are used, and the use of the orthogonal cover codes further satisfies the following condition that: the demodulation reference signals adjacently arranged in the frequency-domain direction in a manner of cross resource blocks also use a group of orthogonal cover codes.

15. The apparatus for multiplexing demodulation reference signals according to claim 9, wherein power or energy of each resource element transmitting the demodulation reference signals is increased.

16. The apparatus for multiplexing demodulation reference signals according to claim 9, wherein the transmitted data and demodulation reference signals support up to 12 UEs or data streams.

17. A communication system, comprising:
one or more User Equipment (UE) configured to:
allocate demodulation reference signals supporting a plurality of User Equipments (UEs) or data streams in one or more time-frequency resource blocks so that the demodulation reference signals of each UE or each data stream occupy subcarriers 0, 1, 6, and 7, or subcarriers 2, 3, 8, and 9, or subcarriers 4, 5, 10, and 11 of each resource block; and
transmit data and the allocated demodulation reference signals using the one or more time-frequency resource blocks; and
a base station configured to:
receive the demodulation reference signals transmitted by the one or more UEs, and perform channel estimation and data demodulation and decoding according to the demodulation reference signals,
wherein, the data and demodulation reference signals of each UE or each data stream occupy subcarriers 0, 1, 6, 7; or subcarriers 2, 3, 8, 9; or subcarriers 4, 5, 10, 11 of each resource block, and wherein
the demodulation reference signals of the plurality of UEs or data streams are superimposed on identical time-domain resources in a manner of frequency-division multiplexing, and the demodulation reference signals of the plurality of the UEs or data streams are superimposed on identical time-frequency resources in a manner of code-division multiplexing.

18. The communication system according to claim 17, wherein the transmitted data and demodulation reference signals support up to 12 UEs or data streams.

* * * * *